US012632738B2

(12) United States Patent
Danial et al.

(10) Patent No.: US 12,632,738 B2
(45) Date of Patent: May 19, 2026

(54) DELTA-SIGMA MODULATION NEURONS FOR HIGH-PRECISION TRAINING OF MEMRISTIVE SYNAPSES IN DEEP NEURAL NETWORKS

(71) Applicant: TECHNION RESEARCH & DEVELOPMENT FOUNDATION LIMITED, Haifa (IL)

(72) Inventors: Loai Danial, Nazareth (IL); Shahar Kvatinsky, Hanaton (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 1234 days.

(21) Appl. No.: 17/299,102

(22) PCT Filed: Dec. 4, 2019

(86) PCT No.: PCT/IL2019/051328
§ 371 (c)(1),
(2) Date: Jun. 2, 2021

(87) PCT Pub. No.: WO2020/115746
PCT Pub. Date: Jun. 11, 2020

(65) Prior Publication Data
US 2022/0058492 A1     Feb. 24, 2022

Related U.S. Application Data

(60) Provisional application No. 62/774,933, filed on Dec. 4, 2018.

(51) Int. Cl.
| | |
|---|---|
| *G06N 3/088* | (2023.01) |
| *G06N 3/049* | (2023.01) |
| *G06N 3/063* | (2023.01) |

(52) U.S. Cl.
CPC ............. *G06N 3/088* (2013.01); *G06N 3/049* (2013.01); *G06N 3/063* (2013.01)

(58) Field of Classification Search
CPC ........ G06N 3/088; G06N 3/049; G06N 3/063; G06N 3/045; G06N 3/065; G06N 3/084;
(Continued)

(56) References Cited

U.S. PATENT DOCUMENTS

| | | |
|---|---|---|
| 2013/0132314 A1 | 5/2013 | Snider |
| 2015/0372805 A1* | 12/2015 | Yoon ...................... H04L 25/02 |
| | | 375/358 |

(Continued)

OTHER PUBLICATIONS

Hasan et al., "On-chip Training of Memristor Based Deep Neural Networks," (2017) (Year: 2017).*
(Continued)

*Primary Examiner* — Li B. Zhen
*Assistant Examiner* — Sadik A Alshahari
(74) *Attorney, Agent, or Firm* — The Roy Gross Law Firm, LLC; Roy D. Gross

(57) ABSTRACT

A neural network comprising: a plurality of interconnected neural network elements, each comprising: a neuron circuit comprising a delta-sigma modulator, and at least one synapse device comprising a memristor connected to an output of said neuron circuit; wherein an adjustable synaptic weighting of said at least one synapse device is set based on said output of said neuron circuit.

12 Claims, 17 Drawing Sheets

(58) Field of Classification Search

CPC ..... G11C 7/1006; G11C 7/16; G11C 2213/74; G11C 2213/79; G11C 13/003; G11C 11/54

See application file for complete search history.

(56) References Cited

U.S. PATENT DOCUMENTS

| | | | | |
|---|---|---|---|---|
| 2016/0042271 | A1* | 2/2016 | Yoon | G06N 3/04 706/25 |
| 2017/0098156 | A1 | 4/2017 | Nino et al. | |
| 2019/0325291 | A1* | 10/2019 | Gokmen | G06N 3/045 |
| 2020/0110991 | A1* | 4/2020 | Kataeva | G06N 20/00 |

OTHER PUBLICATIONS

Murahashi et al., "Pulsed neural networks based on delta-sigma modulation with GHA learning rule and their hardware realization." (2004) (Year: 2004).*

Saffar et al., "A Neural Network Architecture Using High Resolution Multiplying Digital to Analog Converters." (2017) (Year: 2017).*

Yoon et al., "LIF and simplified SRM neurons encode signals into spikes via a form of asynchronous pulse sigma-delta modulation." (2016) (Year: 2016).*

Murahashi_(2) et al., "Realization of 1-bit IIR filter based on delta-sigma modulation under consideration of hardware implementation." (2005) (Year: 2005).*

Hasan, Raqibul, and Tarek M. Taha. "Enabling back propagation training of memristor crossbar neuromorphic processors." (2014). (Year: 2014).*

Negrov, D., et al. "An approximate backpropagation learning rule for memristor based neural networks using synaptic plasticity." (2017). (Year: 2017).*

Danial, Loai & Wainstein, Nicolas & Kraus, Shraga & Kvatinsky, Shahar. (2017). DIDACTIC: A Data-Intelligent Digital-to-Analog Converter with a Trainable Integrated Circuit using Memristors. IEEE Journal on Emerging and Selected Topics in Circuits and Systems. pp. 1-1. 10.1109/JETCAS.2017.2780251.

K. Shima and T. Tsuji, "FPGA Implementation of a Probabilistic Neural Network Using Delta-Sigma Modulation for Pattern Discrimination of EMG Signals," 2007 IEEE/ICME International Conference on Complex Medical Engineering, 2007, pp. 402-407, doi: 10.1109/ICCME.2007.4381765.

L. Danial, S. Thomas and S. Kvatinsky, "Delta-Sigma Modulation Neurons for High-Precision Training of Memristive Synapses in Deep Neural Networks," 2019 IEEE International Symposium on Circuits and Systems (ISCAS), 2019, pp. 1-5, doi: 10.1109/ISCAS. 2019.8702621.

Danial, L., Thomas, S., & Kvatinsky, S. (May 28, 2019). ΔΣ Modulation Neurons for High-Precision Training of Memristive Synapses in DNNs [Paper presentation]. ASIC2, Haifa, Israel.

Cheung, K. F., & Tang, P. Y. (Mar. 1993). Sigma-delta modulation neural networks. In IEEE International Conference on Neural Networks (pp. 489-493). IEEE.

Chakrabartty S, Shaga RK, Aono K. Noise-shaping gradient descent-based online adaptation algorithms for digital calibration of analog circuits. IEEE Trans Neural Netw Learn Syst. Apr. 2013;24(4):554-65. doi: 10.1109/TNNLS.2012.2236572. PMID: 24808377.

D. Soudry, D. Di Castro, A. Gal, A. Kolodny, and S. Kvatinsky, "Memristor-Based Multilayer Neural Networks with Online Gradient Descent Training," IEEE Transactions on Neural Network. Learning Systems, vol. 26, No. 10, pp. 2408-2421, Oct. 2015.

Sandrini, Jury & Attarimashalkoubeh, Behnoush & Shahrabi, Elmira & Krawczuk, Igor & Leblebici, Yusuf. (2016). Effect of metal buffer layer and thermal annealing on HfOx-based ReRAMs. 1-5. 10.1109/ICSEE.2016.7806101.

Rosenthal, E., Greshnikov, S., Soudry, D., & Kvatinsky, S. (May 2016). A fully analog memristor-based neural network with online gradient training. In 2016 IEEE international symposium on circuits and systems (ISCAS) (pp. 1394-1397). IEEE.

S. Kvatinsky, M. Ramadan, E. G. Friedman, and A. Kolodny, "VTEAM: A General Model for Voltage-Controlled Memristors," IEEE Transactions on Circuits and Systems II: Express Briefs, vol. 62, No. 8, pp. 786-790, Aug. 2015.

S. Ambrogio et al., "Neuromorphic Learning and Recognition With One-Transistor-One-Resistor Synapses and Bistable Metal Oxide RRAM," IEEE Transactions on Electron Devices, vol. 63, No. 4, pp. 1508-1515, Apr. 2016.

L. Danial, N. Wainstein, S. Kraus, and S. Kvatinsky, "Breaking Through the Speed-Power-Accuracy Tradeoff in ADCs using a Memristive Neuromorphic Architecture", IEEE Transactions on Emerging Topics in Computational Intelligence, vol. 2, No. 5, pp. 396-409, Oct. 2018.

PCT Search Report for International Application No. PCT/IL2019/051328 mailed Mar. 20, 2020, 5 pp.

PCT Written Opinion for International Application No. PCT/IL2019/051328 mailed Mar. 20, 2020, 4 pp.

PCT Preliminary Report on Patentability for International Application No. PCT/IL2019/051328 mailed Mar. 20, 2020, 5 pp.

* cited by examiner

PRIOR ART

PRIOR ART

Amplitude of input

DELTA-SIGMA MODULATION NEURONS FOR HIGH-PRECISION TRAINING OF MEMRISTIVE SYNAPSES IN DEEP NEURAL NETWORKS

CROSS REFERENCE TO RELATED APPLICATIONS

This application is a National Phase of PCT Patent Application No. PCT/IL2019/051328 having International filing date of Dec. 4, 2019, which claims the benefit of priority under 35 USC § 119(e) of U.S. Provisional Patent Application No. 62/774,933 filed Dec. 4, 2018, the contents of which are all incorporated herein by reference in their entirety.

FIELD OF THE INVENTION

The invention relates generally to the field of cognitive computing.

BACKGROUND

Deep neural networks are modularly constructed using a large number of massively interconnected layers trained to perform inference. A layer is an atomic neural entity, comprising trainable synapses (matrix) and neurons (input vector), abstracted by the vector-matrix multiplication (VMM) dot product. It is commonly trained either using machine learning optimization techniques or neuro-inspired heuristics. However, handling these computationally intensive arithmetic operations, even in custom designed hardware, is constrained due to the excessive data movement between the memory elements and the processing units.

The last decade has witnessed a technological breakthrough in the use of non-volatile nanoscale memory technologies in these applications. Memristors are now being widely adopted in the design of synapses for ANNs because of their small footprint, energy efficiency, and non-volatility. These characteristics allow for synapse-like behavior, where the conductance of the memristor is considered as the synaptic weight of the synapse.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a neural network comprising: a plurality of interconnected neural network elements, each comprising: a neuron circuit comprising a delta-sigma modulator, and at least one synapse device comprising a memristor connected to an output of said neuron circuit; wherein an adjustable synaptic weighting of said at least one synapse device is set based on said output of said neuron circuit.

In some embodiments, the plurality of interconnected neural elements form a trainable single-layer neural network.

In some embodiments, the single-layer neural network is arranged as a memristive crossbar array comprising a synaptic weightings matrix.

In some embodiments, an output vector of said neural network is calculated as a weighted sum of said outputs of said neuron circuits multiplied by said synaptic weightings matrix.

In some embodiments, the neural network further comprises an output circuit comprising at least one delta-sigma modulator, wherein said output circuit encodes said output vector.

In some embodiments, at a training stage, the neural network is trained by an iterative process comprising: (i) inputting analog inputs into said neuron circuits of said neural network; (ii) calculating an output vector as a weighted sum of said outputs of said neuron circuits, based on a said synaptic weightings matrix; and (iii) comparing said output vector to a training dataset input, wherein said comparing leads to an adjustment of said synaptic weightings matrix.

In some embodiments, the adjustment minimizes a cost function based on a gradient descent algorithm using said delta-sigma modulators as an activation function.

In some embodiments, the iterative process continues until said output vector corresponds to said training dataset input.

In some embodiments, the training dataset input is an output of a delta-sigma modulator.

In some embodiments, the neural network comprises two or more of said single-layer neural networks arranged as a multi-layer neural network.

In some embodiments, the neural network further comprises a plurality of input neuron circuits, a plurality of synapse devices, and at least one output neuron circuit, wherein, at a training stage, said neural network is trained by an unsupervised spike-time-dependent plasticity (STDP) process, wherein outputs of said neuron circuits reflect spikes encoded in time.

In some embodiments, the STDP process comprises comparing pre-synaptic and post-synaptic outputs of said neuron circuits, wherein a difference detected in said comparison leads to long-term potentiation or long-term depression.

There is also provided, in an embodiment, a method comprising: providing a neural network comprising a plurality of interconnected neural network elements, each of said neural network elements comprising: a neuron circuit comprising a delta-sigma modulator, and at least one synapse device comprising a memristor connected to an output of said neuron circuit, wherein an adjustable synaptic weighting of said at least one synapse device is set based on said output of said neuron circuit; and at a training stage, training said neural network by an iterative process comprising: (i) inputting analog inputs into said neuron circuits, (ii) calculating an output vector of said neural network as a weighted sum of said outputs of said neuron circuits, based on a said synaptic weightings, and (iii) comparing said output vector to a training dataset input, wherein said comparing leads to an adjustment of said synaptic weightings.

In some embodiments, the plurality of interconnected neural elements form a trainable single-layer neural network.

In some embodiments, the single-layer neural network is arranged as a memristive crossbar array comprising a synaptic weightings matrix.

In some embodiments, the output vector is calculated as a weighted sum of said outputs of said neuron circuits multiplied by said synaptic weightings matrix.

In some embodiments, the neural network further comprises an output circuit comprising at least one delta-sigma modulator, wherein said output circuit encodes said output vector.

In some embodiments, the adjustment minimizes a cost function based on a gradient descent algorithm using said delta-sigma modulators as an activation function.

In some embodiments, the iterative process continues until said output vector corresponds to said training dataset input.

In some embodiments, the training dataset input is an output of a delta-sigma modulator.

In some embodiments, the neural network comprises two or more of said single-layer neural networks arranged as a multi-layer neural network.

In some embodiments, the neural network comprises a plurality of said neuron circuits as inputs, a corresponding plurality of said synapse devices, and at least one said neuron circuit as an output, and wherein said training is an unsupervised spike-time-dependent plasticity (STDP) process in which outputs of said neuron circuits reflect spikes encoded in time.

In some embodiments, the STDP process comprises comparing pre-synaptic and post-synaptic outputs of said neuron circuits, wherein a difference detected in said comparison leads to long-term potentiation or long-term depression.

There is further provided, in an embodiment, a memristor driver circuit comprising: a delta-sigma modulator configured to receive an input voltage and output a binary sequence representing an amplitude of said input signal; a memristive device; and at least one subtractor; wherein said input voltage is one of: (i) a read voltage selected to produce a desired duty cycle of said delta-sigma modulator, and (ii) an updating voltage reflecting a subtraction operation between a reference voltage and an output signal of said memristive device.

In some embodiments, the memristor driver circuit represents a trainable neural network circuit.

In some embodiments, the memristor driver comprises a plurality of interconnected said memristor driver circuits arranged as a trainable single-layer neural network.

In some embodiments, the single-layer neural network is arranged as a memristive crossbar array comprising a synaptic weightings matrix.

In some embodiments, the read voltage is used at a read stage of said memristive device, and wherein said updating voltage is used at a training stage of said memristive device.

In some embodiments, the read stage reflects a feedforward operation of said neural network, and said update stage reflects an error backpropagation operation of said neural network.

In some embodiments, the memristor driver circuit further comprises at least one operational amplifier configured to amplify said output signal of said memristive device.

There is further provided, in an embodiment, a method comprising: providing a memristor driver circuit representing a trainable neural network circuit, wherein said memristor driver circuit comprises: a delta-sigma modulator configured to receive an input voltage and output a binary sequence representing an amplitude of said input signal, a memristive device, and at least one subtractor; and training said memristor driver circuit by an iterative process comprising: (i) a read stage wherein said input voltage is a read voltage selected to produce a desired duty cycle of said delta-sigma modulator, and (ii) an update stage wherein said input voltage is an updating voltage reflecting a subtraction operation between a reference voltage and an output signal of said memristive device.

In some embodiments, the memristor driver circuit comprises a plurality of interconnected said memristor driver circuits arranged as a trainable single-layer neural network.

In some embodiments, the single-layer neural network is arranged as a memristive crossbar array comprising a synaptic weightings matrix.

In some embodiments, the read stage reflects a feedforward operation of the neural network, and said update stage reflects an error backpropagation operation of the neural network.

In some embodiments, the iterative process minimizes a cost function based on a gradient descent algorithm using said delta-sigma modulators as an activation function.

In some embodiments, the memristor driver circuit further comprises at least one operational amplifier configured to amplify said output signal of said memristive device.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1B:
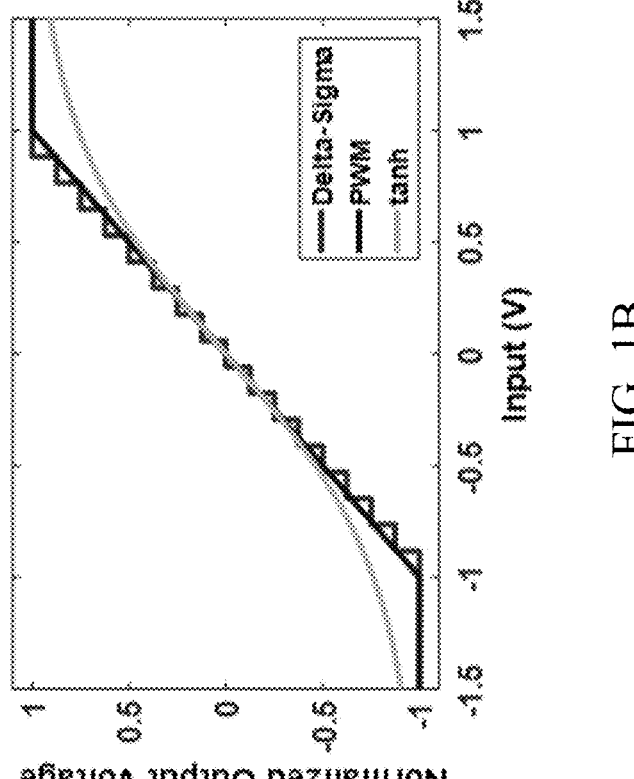
FIG. 1B shows similarity between and PWM transfer functions and tanh activation function.

Disclosed herein are a method and system employing delta-sigma ($\Delta\Sigma$) modulators neuron as a neuron activation function for inference and training of artificial analog neural networks. In some embodiments, delta-sigma ($\Delta\Sigma$) modulation neurons are used for implementing real-time training in reconfigurable memristive arrays.

The disclosed modulation neurons may be implemented in a wide variety of applications, including, but not limited to, as neuron activation functions in deep neural networks implementations for machine learning accelerators (e.g., in inference and training stages for computer vision, speech recognition, automotive, and finance applications). Additional applications may include programming algorithm controllers for multi-level cells non-volatile memory, analog and mixed-signal circuits, and in computer hardware and chipsets.

A potential advantage of the present invention is, therefore, in that it utilizes the resemblance between a biological neuron and a ΔΣ modulator to improve training and inference accuracy, by precise programming control of memristive synapses. In some embodiments, this approach may overcome the intrinsic variability of the memristors, in a solution which encodes information using firing rates and timing spikes and consumes less power budget than PWM. In some embodiments, the present approach eliminates data movements out of the memory structure, and therefore reduces energy consumption, improves execution time, and is thus suitable for low power applications.

In some embodiments, the present disclosure takes advantage of the amplitude-to-frequency modulation property of delta-sigma modulators (ΔΣ) for emulating the spike generation mechanism and information coding process of biological neurons.

As background, biological neurons exchange information through spikes. Since all the spikes are similar, the information is not encoded in the shape, but rather the frequency. Accordingly, amplitude to frequency modulation takes place inside the neuron. Similarly to the biological neuron, the ΔΣ modulator encodes the input voltage signal into 1s and 0s. The inputs are summed up at the integrator. When they cross the threshold imposed by the comparator, the ΔΣ modulator gives out a 1. This 1 is fed-back to the integrator, bringing the voltage below the threshold.

The nerve cell, or the neuron, is the computational unit of living organisms. The inputs to a neuron come in through the dendrites. They get summed up, and when they cross a particular threshold, the neuron 'fires,' or sends a spike of voltage, called an action potential through the axon, to the next neuron, through axon endings. These spikes are followed by a short 'reset' period called refractory period. Between each two neurons, there exists a synapse. The spikes from a presynaptic neuron passes through the synapse, to the post synaptic neuron. This synapse is responsible for controlling the learning process. The release of a complex chain of neurotransmitters at the synapse, upon the arrival of an action potential, controls the learning.

In some embodiments, properties such as oversampling, averaging, and noise-shaping features of the ΔΣ modulators allow for high neural coding accuracy and mitigate the intrinsic noise level in neural networks. In some embodiments, the inherent dithering property of the ΔΣ modulator prevents the weights from being stuck in a spurious local minimum, and its non-linear transfer function makes it attractive for multi-layer architectures.

In some embodiments, memristive synapses are used as weights in the network, and are trained by supervised or unsupervised machine learning (ML) algorithms, using, e.g., stochastic gradient descent (SGD) or biologically plausible spike-time-dependent plasticity (STDP).

Neuro-inspired computing architectures are designed to accelerate real-time data-driven applications by mimicking intrinsic properties of the human brain to handle growing data volumes, by means of adaptive capabilities, massively parallel interconnections, noise tolerance, and energy efficiency.

To implement these new architectures, researchers have turned to machine learning (ML) for inspiration, as it has already achieved adaptive and error-tolerant training in a software environment.

ML is now prevalent in all domains of engineering. The trainability feature of ML algorithms allows them to be used independently in continuously varying conditions. artificial neural networks (ANNs) are an example of such trainable architectures. The building blocks of these architectures are synapses that could be trained to store weights for the network functionality, and neurons that collectively interact to encode and transmit information. Deep neural networks are modularly constructed using a large number of massively interconnected layers trained to perform inference. A layer is an atomic neural entity, comprising trainable synapses (matrix) and neurons (input vector), abstracted by the vector-matrix multiplication (VMM) dot product. It is commonly trained either using ML optimization techniques, e.g., stochastic gradient descent (SGD), or using neuro-inspired heuristics, e.g., spike-time-dependent plasticity (STDP).

However, handling computationally intensive arithmetic operations, even in custom designed hardware (ASIC), is constrained due to the excessive data movement between the memory elements and the processing units. Implementing hardware for ANNs requires novel circuits and devices, capable of handling fast VMMs with added non-volatile storage capabilities. The last decade has witnessed a technological breakthrough in non-volatile nanoscale memory technologies. Memristors are now being widely adopted in the design of synapses for ANNs because of their small size, energy efficiency, and non-volatility. These characteristics allow for synapse-like behavior, where the conductance of the memristor is considered as the synaptic weight. Using a resistive platform for computation can accelerate VMM as a result of Ohm's and Kirchhoff's laws, and reconfigure it using memristor-compatible ML algorithms. Furthermore, physically realizable memristive synapses have sparked neuroscience in spike-based learning techniques.

Still, several challenges have hindered the practical use of memristor technology. The main obstacles in this regard are variability, the stochastic nature of memristor switching, and integration with existing technologies. Currently, the most common approach to achieving the functionality of a biological neuron using a mature CMOS technology is the leaky integrate and fire (LIF) model. Pulse width modulation (PWM) neurons have been also suggested. While the LIF neuron does not shape white noise sufficiently, due to its backward reset, the PWM neuron does not filter noise, due to its feedforward structure. Furthermore, the neural spike code remains a central problem in neuroscience: there is no consensus as to whether information is encoded in firing rates, or in individual spike timing.

Accordingly, in some embodiments, the present disclosure provides for a novel approach, inspired by the fault-tolerant biological neuron. The present disclosure uses the resemblance between a biological neuron and a delta-sigma (ΔΣ) modulator (see, e.g., K. F. Cheung and P. Y. H. Tang, "Sigma-Delta Modulation Neural Networks," Proceedings of the IEEE International Conference on Neural Networks, Vol. 1, pp. 489-493, March 1993) to improve training and inference accuracy, by precise programming control of memristive synapses. In some embodiments, this approach overcomes the intrinsic variability of the memristors, encodes information using frequency of a pulse-train, and achieves high training and inference accuracy. $\Delta\Sigma$ modulators are traditionally used as building blocks in high resolution data converters with remarkable noise tolerance. The present disclosure utilizes the proposed neurons for performing supervised learning using SGD and unsupervised learning using STDP.

BACKGROUND

Memristive Synapses

Memristors are two-terminal passive devices with varying resistance which changes according to the current flowing through the device, or alternatively, the voltage across the device. Memristors primarily serve as non-volatile memory and can be used for both digital and analog applications. The activation-dependent dynamics of memristors make them a promising feature for registering and updating synaptic weights. The high-to-low resistance (HRS/LRS) ratio is an important factor in determining the maximum number of available resistive levels, with device non-linearity, noise, endurance, and Poisson distributed stochastic switching placing a limit on exercising these levels.

in some embodiments, the present disclosure employs a VTEAM memristor model (see, e.g., S. Kvatinsky, M. Ramadan, E. G. Friedman, and A. Kolodny, "VTEAM: A General Model for Voltage-Controlled Memristors," IEEE Transactions on Circuits and Systems II: Express Briefs, Vol. 62, No. 8, pp. 786-790, August 2015) with parameters fitted for a linearized Pt/HfOx/Hf/TIN RRAM device with a metal buffer layer. The device provides low forming and programming voltage with a high-to-low resistance state (HRS/LRS) ratio of approximately 50.

Figure 1A:
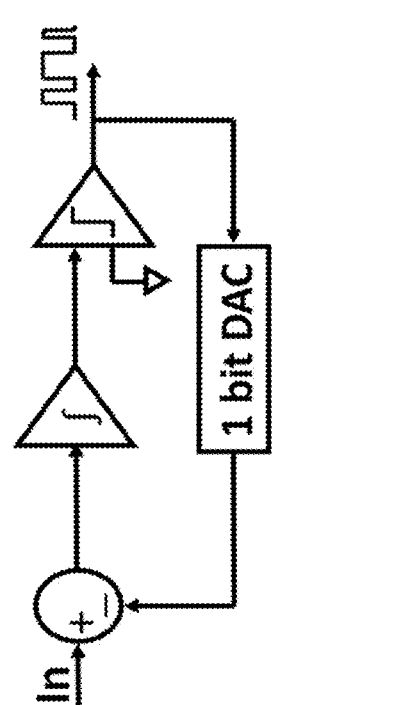
FIG. 1A shows a first order $\Delta\Sigma$ modulator.
Figure 1D:
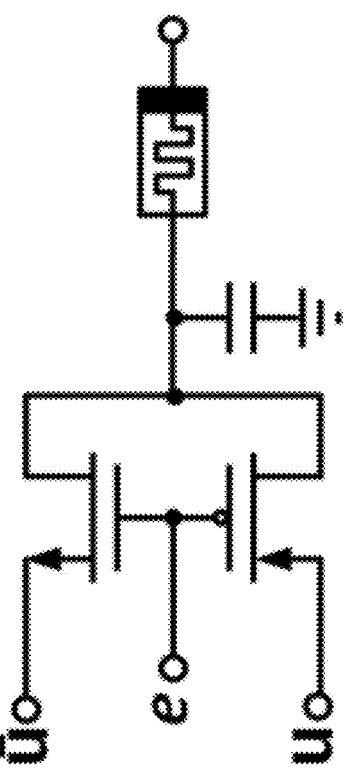
FIG. 1D is a 2T-1R synapse implementing non-volatile weight, where the shock capacitor is added to eliminate noise.
Figure 1C:
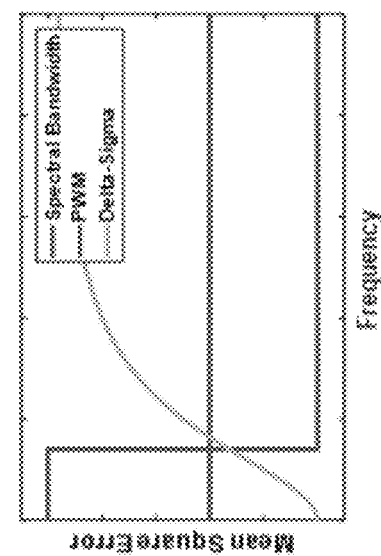
FIG. 1C shows spectral noise shaping of $\Delta\Sigma$. The spectral bandwidth is derived from the spectral representation of a cost function.
Figure 1E:
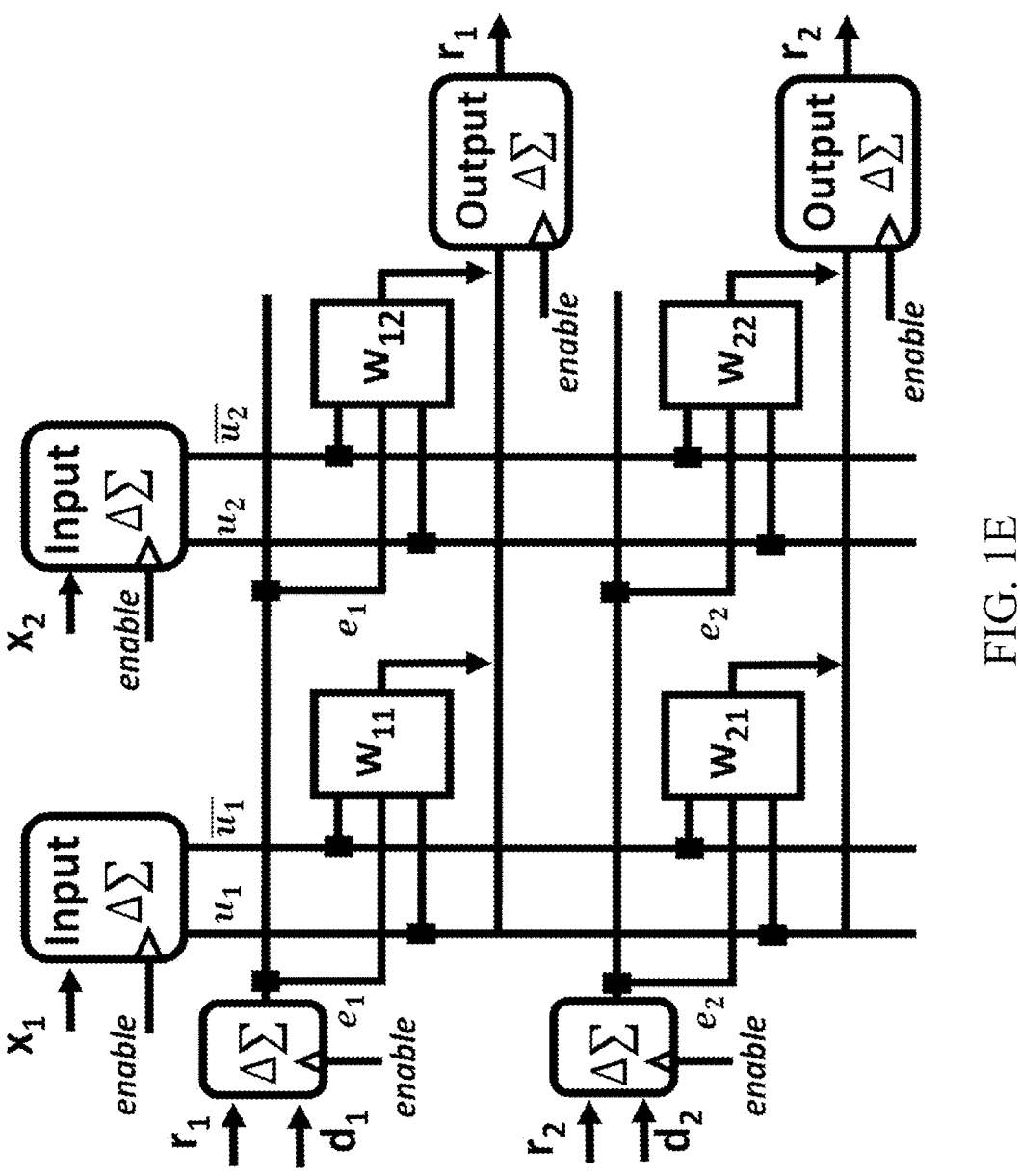
FIG. 1E shows a single layer architecture of a 2×2 ANN with weights $w_{i,j}$, and $x_j$ inputs ($i, j \leq 2$), designed using 2T-1R synapses and $\Delta\Sigma$ neurons.

Memristive crossbar arrays inherently implement VMM by Ohm's and Kirchhoff's laws for ANN hardware realization. The output vector r corresponding to a layer is determined as:

$$r = Wx, \tag{1}$$

where W is the synaptic weight matrix, realized by the conductance values of memristors inside the crossbar, and x is the layer's input neuron vector, computed by the activations of the input neurons, e.g., LIF, PWM or $\Delta\Sigma$ (see FIG. 1E).

CMOS Neuron Models: LIF and PWM

The LIF neuron model uses a leaky capacitor to model the neuron membrane. A spike is generated if the capacitor voltage crosses a pre-defined threshold, followed by a gradual reset. LIF remains the preferred model for spiking neural networks (SNNs) that rely on spike-based learning rules for unsupervised learning.

PWM is a technique for encoding an analog input of a varying magnitude to output pulses with constant amplitude, and varying pulse width proportional to the analog input magnitude. The PWM activation function has been used to model neurons which have successfully trained ANNs using supervised learning.

Training Algorithms: SGD and STDP

Stochastic gradient descent (SGD) is a popular supervised learning algorithm for training ANNs by updating the synaptic weights W. The input vector is primarily randomized. The weight update (after each instance) aims to minimize a cost function, for example, the mean square error:

$$E_j = 1/2 \sum_{k=1}^{K} \left( d_j^k - r_j^k \right)^2, \tag{2}$$

where $E_j$ is the mean square error (MSE) of the jth neuron, k is the iteration count, and d is the expected value of the output. The weight update rule is used with an $\eta$ learning rate:

$$\Delta W_{ji} = \eta \frac{\partial E_j}{\partial W_{ji}}. \tag{3}$$

STDP is a biological process that adjusts synaptic strengths in the brain. The STDP algorithm is applied locally to a synapse with an emphasis on spike timings. If the presynaptic neuron fires before (after) the postsynaptic neuron, the synapse is strengthened (weakened). Studies have shown that memristors can accurately emulate a biological synapse, with several efforts to demonstrate STDP locally on memristive synapses.

SGD and STDP learning rules are functionally different, with the latter requiring purely spike-encoded information. SGD is widely used in supervised learning for classification tasks, with a teacher signal label to iteratively optimize the cost function in Eq. (2), using the backpropagation algorithm. STDP, on the other hand, can be efficiently used in unsupervised learning for clustering tasks, to perform online training and simultaneous synaptic updates.

Delta-Sigma ($\Delta\Sigma$) Modulator

A $\Delta\Sigma$ modulator, shown in FIG. 1A, is a circuit topology that is an analog-to-digital converter that achieves high resolution using a high oversampling ratio and inherent noise shaping.

A $\Delta\Sigma$ modulator may be used to modulate the amplitude of input signals to a binary sequence, with the percentage of Is proportional to the amplitude. The $\Delta\Sigma$ modulator encodes the amplitude of the input signal into frequency of 1s. If the amplitude of the pulse is positive, the output will have a higher number of 1s and vice versa. At 0 input, we get 50% duty cycle output. The difference between the input and the previous output passes through an integrator. A comparator samples the integrated voltages and produces the 1s and 0s. A digital-to-analog converter (DAC) is the used to convert these 1s and 0s back to $V_{plus}$ and $V_{minus}$. The input to the modulator can be a continuous voltage signal, varying between the $V_{plus}$ and $V_{minus}$ values of the DAC. This is so that the integrator does not become unstable. The oversampling ratio of the converter is defined as the ratio of the sampling frequency to the Nyquist sampling frequency:

$$OSR = \frac{f_s}{f_{nyquist}}$$

Because the comparator is the source of quantization noise, two transfer functions can be defined, a signal to transfer function (STF), and a noise to transfer function (NTF). The STF is a low pass filter while the NTF is a high pass filter. This HPF pushes the quantization noise to high frequencies. This is known as noise shaping. Once this is done, the input can be recovered by using a digital low pass filter (an averaging filer) at the output of the modulator.

The SNR of a $\Delta\Sigma$ ADC is:

$$SNR = 6.02N + 1.76 + 10 \log(OSR)$$

A $\Delta\Sigma$ modulator may be employed as a building block in high-resolution ADCs, where the conversion is done by cascading the modulator and an averaging filter. The $\Delta\Sigma$ modulator uses noise shaping and oversampling techniques to achieve high signal-to-noise ratio (SNR). If $X_i$, q, s, and $X_o$ are, respectively, the input, quantization noise, frequency and the output, at the Laplace domain, then $$X_o(s) = \frac{X_i(s) \cdot s}{1+s} + \frac{q(s)}{1+s} \qquad (4)$$

Trainable ANN Architecture
Delta-Sigma ($\Delta\Sigma$) Neuron

In some embodiments, the present disclosure provides for a $\Delta\Sigma$ modulator as the artificial neuron due to its similarity to a biological neuron. The action potential spike of a biological neuron has the same shape irrespective of the input. This suggests that the information is encoded in the frequency of spikes, which is similar to a $\Delta\Sigma$ modulation. Moreover, the action potential has periodic binary stages: a fired state and a resting state, just like the spectrally-distributed Vhigh and Vlow pulse-train output of the $\Delta\Sigma$ modulator. The transfer function of the $\Delta\Sigma$ is similar to widely-used ANN activation functions, e.g., tanh and sigmoid, as shown in FIG. 1B. in FIG. 1B, the plotted output is extracted from the pulses' product in response to an input and normalized. The discrete steps in the $\Delta\Sigma$ make the weights intolerant to small input variations so that they move in the direction of the maximum gradient.

The spectral bandwidth, derived from the cost function in Eq. (2), is limited to low frequencies in the spectral domain. The presence of noise within this bandwidth can adversely affect training time and accuracy. The noise-shaping property of $\Delta\Sigma$ can push the noise out of the required low-frequency spectral bandwidth, according to Eq. (4), as shown in FIG. 1C. The spectral bandwidth is derived from the spectral representation of a cost function. This provides higher SNR compared to PWM, where the noise floor is relatively unaltered. Moreover, the inherent dithering property of the $\Delta\Sigma$ may prevent the weights from being stuck at a locally stable state during training.

2T-1R Synapse

The 2T-1R synapse, as proposed in, e.g., D. Soudry et al., "Memristor-Based Multilayer Neural Networks with Online Gradient Descent Training," IEEE Transactions on Neural Network. Learning Systems, Vol. 26, No. 10, pp. 2408-2421 October 2015, and shown in FIG. 1D, is used in the present ANN design to support SGD; the synapse consists of a single memristor, PMOS and NMOS transistors, with gates connected to a common enable input e. When e=$V_{DD}$ (−$V_{DD}$), the NMOS (PMOS) turns on and $\bar{u}$(u) is passed to the output. When e=0, neither input is passed, and the output is zero. Note that u and $\bar{u}$ are complements. Further details regarding keeping the transistors in the proper regime are discussed in Soudry [2015].

Single-Layer ANN Trained by SGD

In some embodiments, the present disclosure provides for using $\Delta\Sigma$ neurons to achieve supervised learning using SGD. An architectural schematic of the single-layer circuit is given in FIG. 1E. For a single-layer ANN using $\Delta\Sigma$ neurons, Eq. (3) is reduced to $$\Delta W_{ji} = \eta x_i [(d)_j - r_j + q]. \qquad (5)$$

The training period consists of three phases: a read phase, an update phase, and a reset phase. During the read phase, the analog inputs $x_i$ are fed into the $\Delta\Sigma$ modulator. Each modulator output is multiplexed and shorted to u input of the (i, j)2T−1R synapse, which has its enable e latched to −$V_{DD}$ during the read phase.

After being multiplied by the weights, the inputs are then summed. The sum, $r_j = W_{ij}x_i$, is held by the integrator of $\Delta\Sigma$. During this phase, the read enable is set high, while the update and reset enables are set low.

During the update phase, only the update enable is set high. The data stored in the memory element, $r_j$, is fed into a $\Delta\Sigma_j$. Each desired value $d_j$ is also $\Delta\Sigma$ modulated. The two modulated outputs are passed through a subtractor, whose output is now connected to enable e. If the output of the $\Delta\Sigma$ modulator has the stages, $V_{DD}$ and −$V_{DD}$, then e can have three possible values: $V_{DD}$,−$V_{DD}$ and 0. Each input $x_i$ is attenuated, ensuring that the transistors conduct in the ohmic regime, and is connected to u and $\bar{u}$ inputs of the synapse. The overall learning rate $\eta$ is determined by the physical properties of the memristor, represented by the model parameters, and the $\Delta\Sigma$ pulse width. Each update phase is followed by a reset phase, which clears the memory elements and the integrators in $\Delta\Sigma$ so that different input instances will not interfere.

Multi-Layer ANN Trained by SGD

Figure 2:
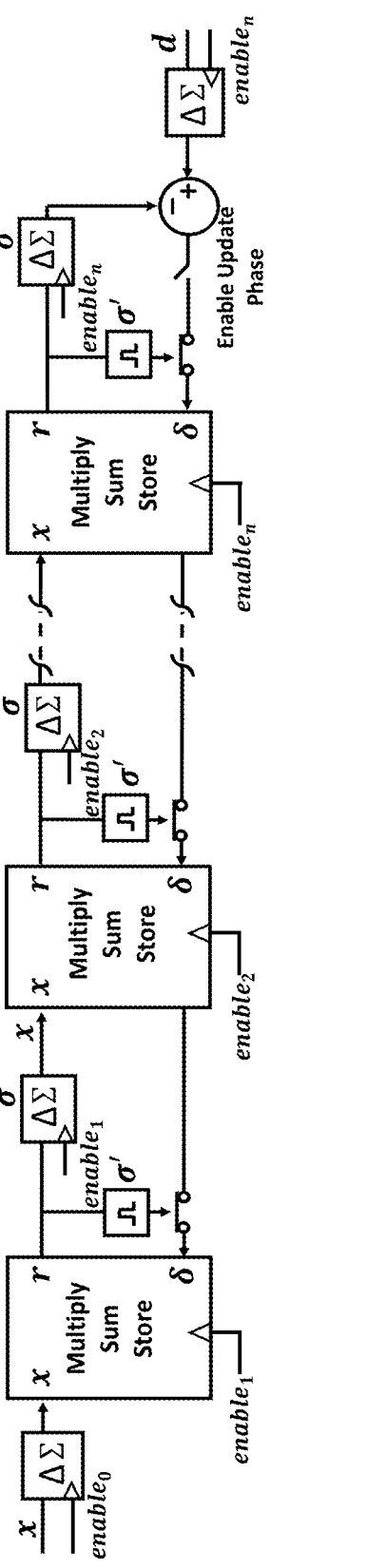
FIG. 2 is a multi-layer neural network architecture using $\Delta\Sigma$ neurons, according to an embodiment.

For a $\Delta\Sigma$ neural network with N layers as shown in FIG. 2, Eq. (3) is reduced to $$\Delta W_{ji} = \eta \delta_j x_i, \qquad (6)$$

where in the outermost layer, $$\delta_j^{(o)}$$

corresponds to $$\delta_j^{(o)} = (d_j - r_j + q) \cdot \frac{\partial f_j}{\partial x_j}, \qquad (7)$$

and in the remaining hidden layers, $$\delta_j^{(h)}$$

corresponds to $$\delta_j^{(h)} = \sum_m W_{jm}^{(h+1)} \cdot \delta_m^{(h+1)} \cdot \frac{\partial f_j}{\partial x_j} \qquad (8)$$

The quantization noise is negligible, and the derivatives of the $\Delta\Sigma$ transfer function can be approximated as 1 within the interval [−1, 1] and 0 otherwise. Similarly to the single-layer design, the training consists of three phases, with the signals local to each layer. During the read phase of the $i^{th}$ layer, the remaining read, update and reset enable of the other layers are set low. The inputs to a layer are fed into a $\Delta\Sigma$ modulator. The outputs of the modulator are multiplied by weights, summed, and then stored, serving as the input to the next layer. This way, the input propagates from the first layer to the last.

During the update phase, the delta values corresponding to each layer are successively computed layer by layer, starting from the last. Once this is done, Eq. (6) is used to update the weights. The update phase is followed by a reset phase to flush the storage units and integrators in $\Delta\Sigma$. Assume that the $\Delta\Sigma$ modulator output is set at a width of $\tau$ seconds. The time required to perform each of the phases on an N-layer network will be N·τ, (N+1)·τ, and $\tau_{reset}$ seconds, respectively.

ΔΣ Memristor Driver

Figures 3A, 3B:
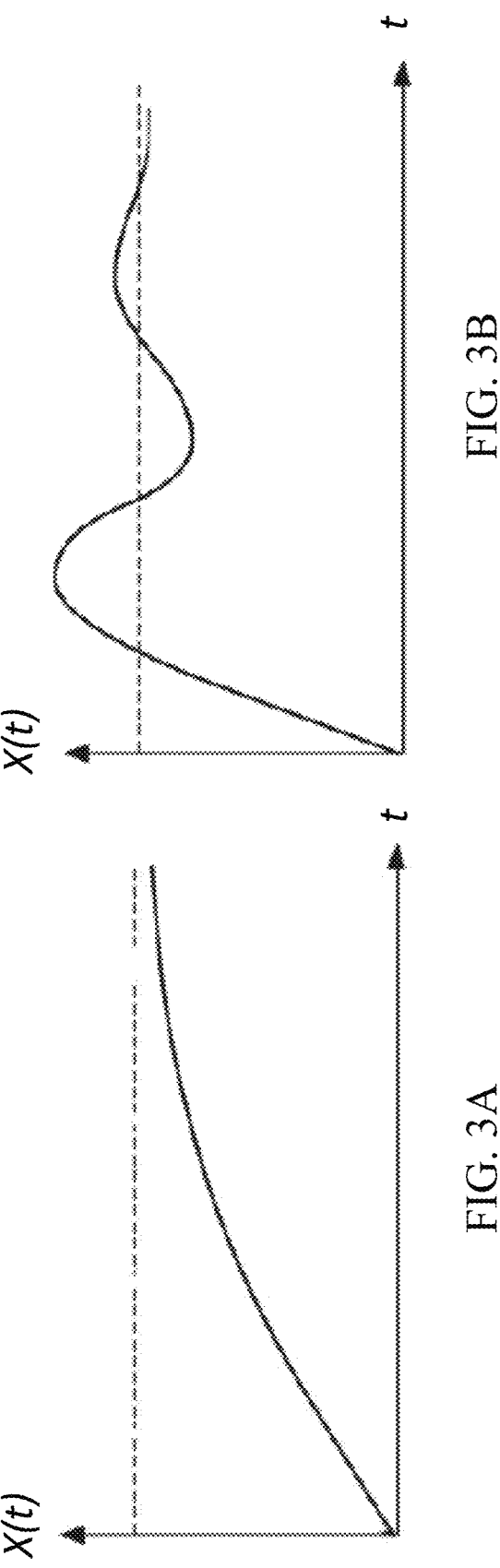
FIGS. 3A-3B show driver action for a $\Delta\Sigma$ modulator, according to an embodiment.

In some embodiments, the present disclosure provides for a driver for setting and re-setting memristors with high precision. Known memristor drivers use techniques such as PWM or PAM for writing, however, these methods have limited noise handling capabilities. In addition, in case the driver overshoots the required target state, then the memristor has to be reset and has to be written again. A Δ-Σ modulator-based driver will not have this problem due to its inherent dithering. FIG. 3A shows a driver action for PWM/PAM, and FIG. 3B shows driver action for ΔΣ.

The first task is to calculate the operating point of the circuit. In this design, the memristor parameters used are from L. Danial, N. Wainstein, S. Kraus, S. Kvatinsky, "DIDACTIC: A Data-Intelligent Digital-to-Analog Converter with a Trainable Integrated Circuit using Memristors. In addition, the ΔΣ modulator is fitted with an amplifier at the output so that it gives 0.45 and −0.45, instead of 1s and −1s. This is done so that the write voltage is close to the memristor threshold of 0.4 and −0.3.

If 0V is passed through a ΔΣ modulator and the output is passed to the memristor, it can be observed that the state variable decays with time. This may be explained by the VTEAM model:

$$\frac{dw(t)}{dt} = \begin{cases} k_{off}\left(\frac{v(t)}{v_{off}} - 1\right)^{\alpha_{off}} \cdot f_{off}(w), & 0 < v_{off} < v \\ 0, & v_{on} < v < v_{off} \\ k_{on}\left(\frac{v(t)}{v_{on}} - 1\right)^{\alpha_{on}} \cdot f_{on}(w), & 0 < v_{on} < v \end{cases}$$

Using a square window function and after plugging in the parameters:

$$\frac{dw}{dt} = \begin{cases} 3.5 \times 10^{-4}, & 0 < v_{off} < 0.45 \\ 0, & v_{on} < v < v_{off} \\ -6 \times 10^{-4}, & v < v_{on} < 0 \end{cases}$$

As can be seen, the absolute value of $$\frac{dw}{dt}$$

is more negative than positive. This is why the state variable decays overtime, despite the duty cycle being 50%. For compensating this, the duty cycle should be more than 50%, using a positive voltage at the input of the ΔΣ modulator. To calculate the value of this voltage numerically, first the ratio $$\frac{6 \times 10^{-4}}{3.5 \times 10^{-4}} = 1.71428547 = 171.428547\%$$

is taken, and next value of the input of the ΔΣ modulator that will provide this duty cycle at the output is found. The term duty cycle is used herein to mean the number of negative pulses divided by the number of positive pulses.

Figure 4A:
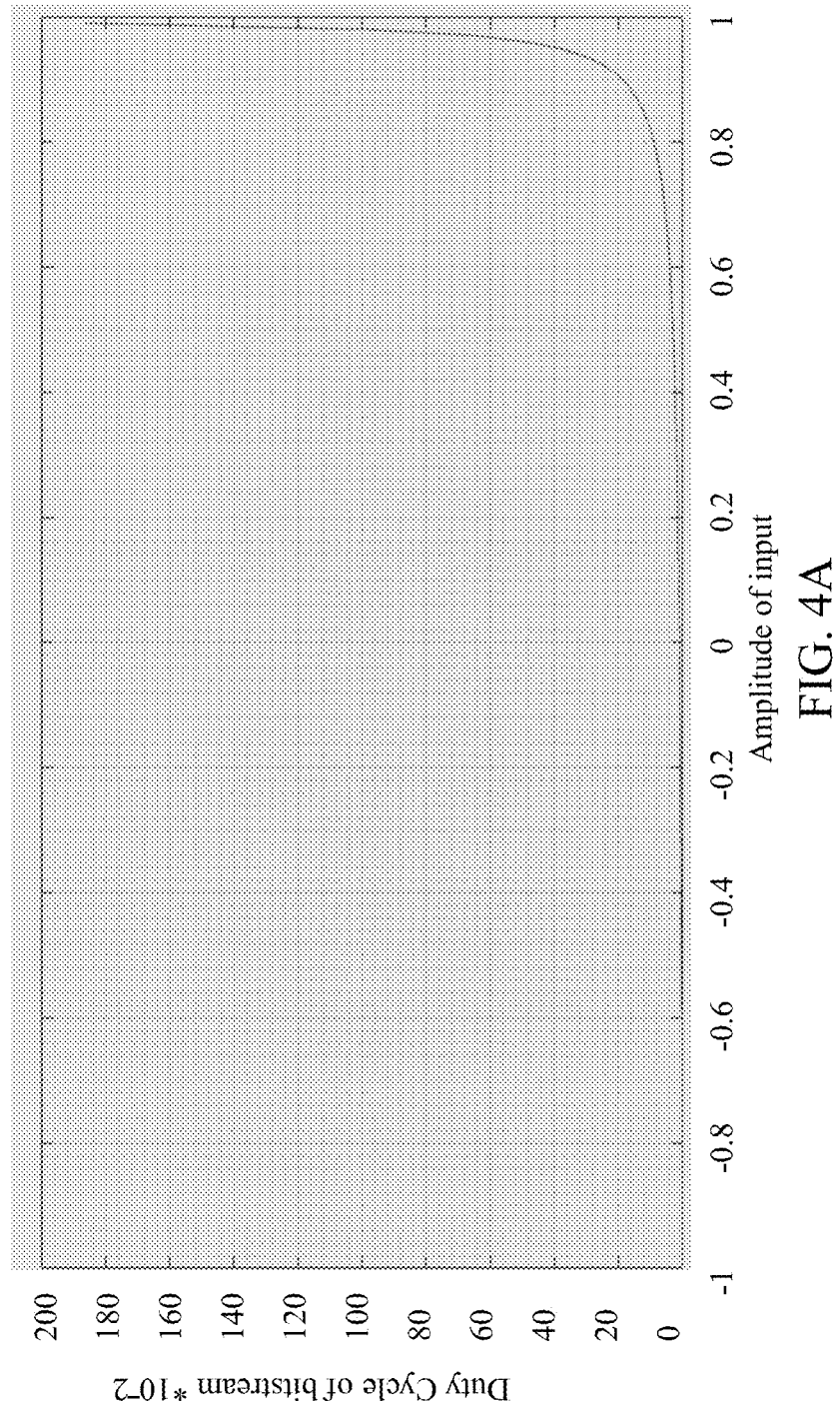
FIGS. 4A-4B show amplitude vs. duty cycle of a $\Delta\Sigma$ modulator, according to an embodiment.
Figure 4B:
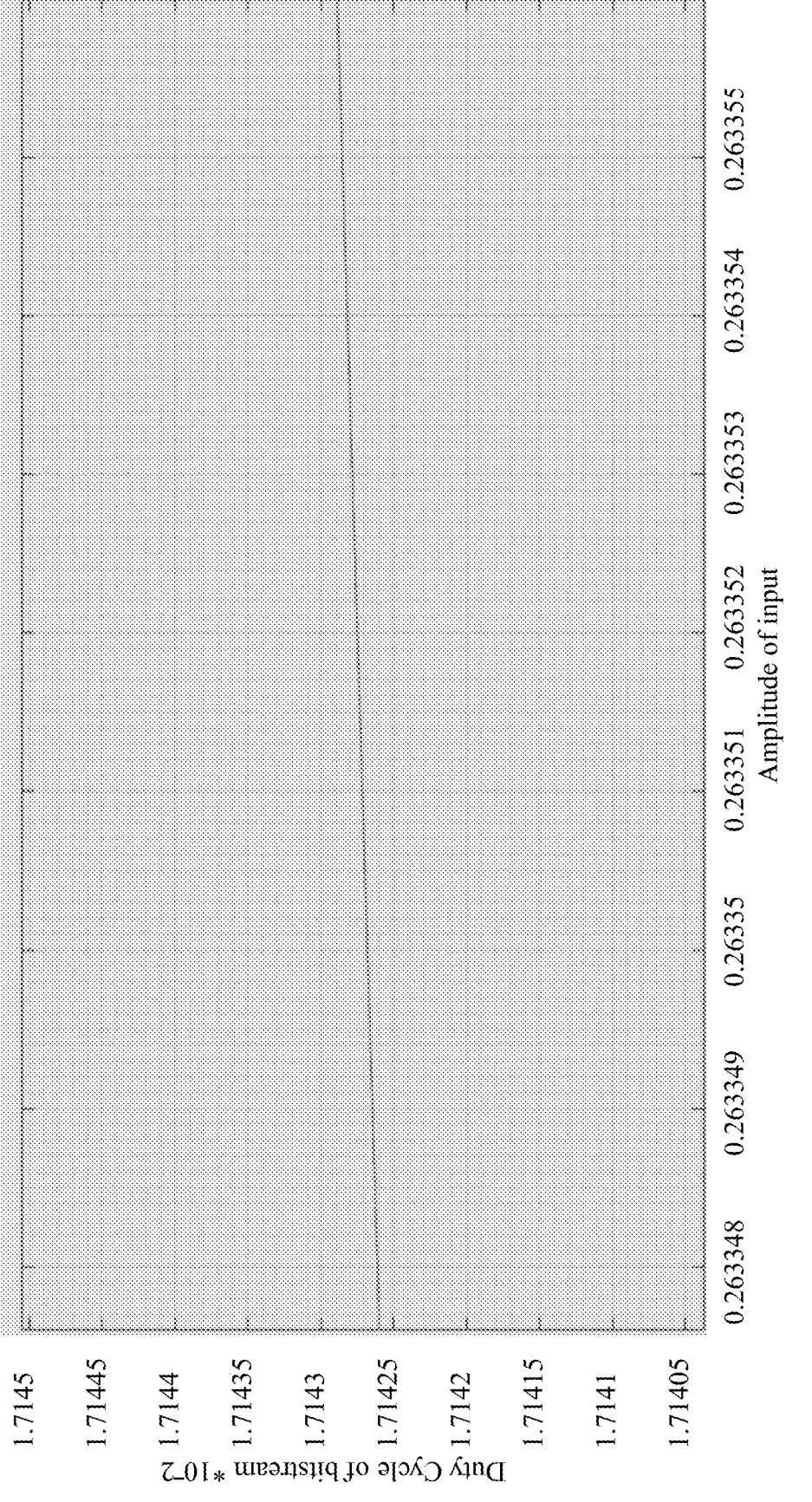

After running a ΔΣ modulator script iteratively, for a large range of input voltages, the amplitude is plotted vs the duty cycle, as can be seen in FIGS. 4A and 4B (using different scales. From FIG. 4B, the value of amplitude can be calculated as approximately 0.2633534465. This can be defined as a 'virtual ground' of the memristor ΔΣ topology. Accordingly, if this voltage is provided at the input, then the state variable of the memristor should remain relatively constant. This virtual ground voltage can now be chosen as the operating point of further memristor ΔΣ topologies.

Figure 4C:
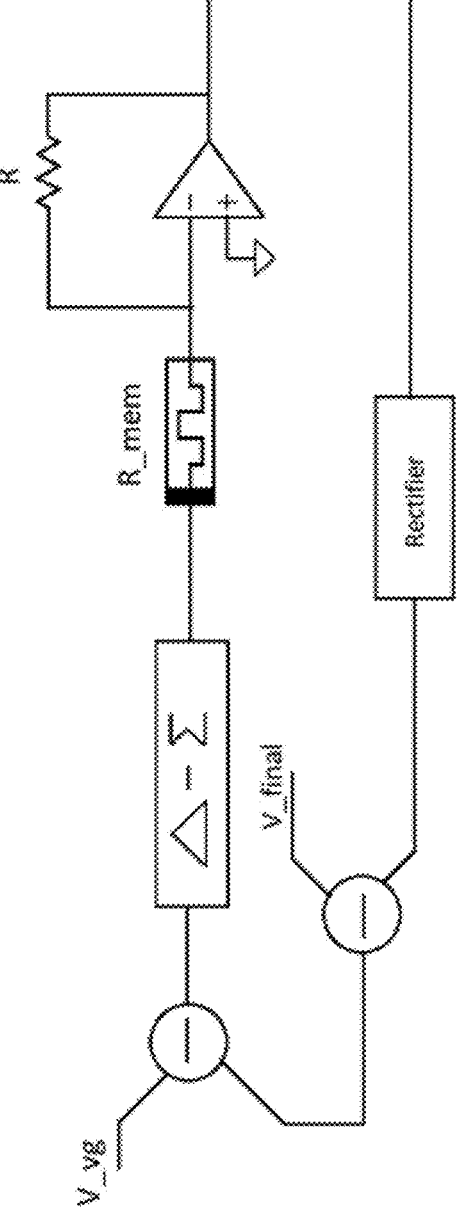
FIG. 4C shows an exemplary memristor driver, according to an embodiment.

FIG. 4C shows an exemplary memristor driver according to an embodiment. In FIG. 4C, V_vg is the virtual ground voltage previously mentioned, and V_final is ideally the output of the opamp, if the memristor achieves the target. Hence V_final−V_out, superimposed on the operating point of V_Vg will give the required target state. The present circuit would work even in the presence of a large amount of noise, because of the feedback loop. In the following equation, 0.45 comes from the output voltage of the Δ-Σ modulator. R is the feedback resistance and (98x+2) is the memristance:

$$V_{final} = 0.45 \times \frac{R}{98x + 2}.$$

Spike Time Dependent Plasticity (STDP)

STDP is the biological learning mechanism, wherein weights are adjusted according to the relative timing of spikes. If a pre-synaptic neuron fires before the post-synaptic neuron, then the synapse gets strengthened. Otherwise the synapse weakens.

Let:

$$\Delta T = t_{pre} - t_{post}.$$

Let the amount of change in weight be ΔW. The weight update follows the following the rule illustrated in the graph in FIG. 5A, as an inverse between Δw and Δt.

As detailed above, there is a close resemblance between a ΔΣ modulator and a biological neuron. This resemblance indicates that ΔΣ neurons would resemble biological STDP to a closer extent than other existing neurons. Existing neuron circuits work by generating specific voltage signals upon the firing of neurons. These voltage signals then encode the time variations to voltage.

Figure 5A:
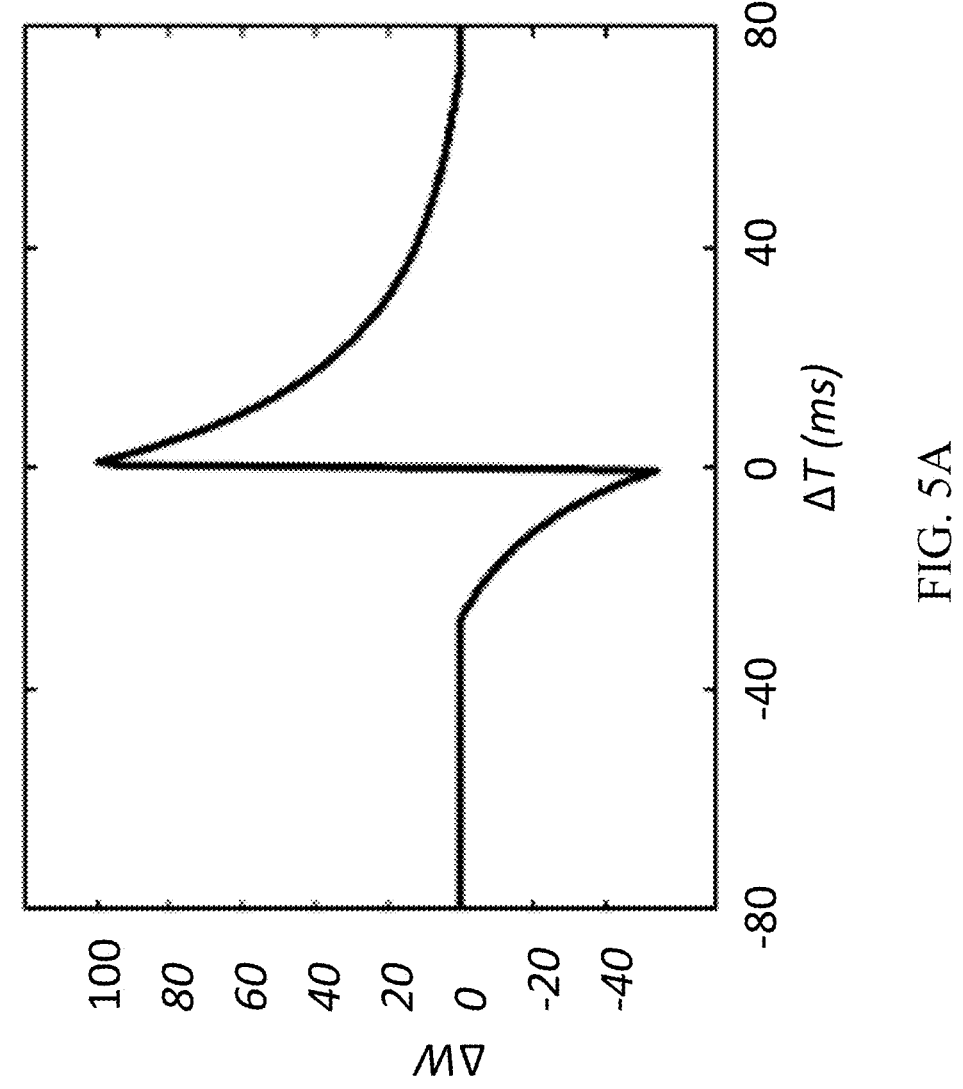
FIG. 5A shows STDP weight update rule.

In some embodiments, the present disclosure provides for an exemplary circuit design which achieves the inverse proportionality in FIG. 5A. The purpose of the circuit is to achieve the following states:

| CASE | ACTION |
| --- | --- |
| Pre: Does not Fire Post: Does not Fire | READ |
| Pre: Fires Post: Does not Fire | STRONG READ |
| Pre: Fire First Post: Fire Later | LTP |
| Pre: Fire Later Post: Fire First | LTD |

When both neurons do not fire, a weak read voltage (less than the threshold) passes through the memristor. When only the pre-synaptic neuron fires, a voltage (less than the threshold), but greater than the previous value, passes through the synapse.

Figure 5B:
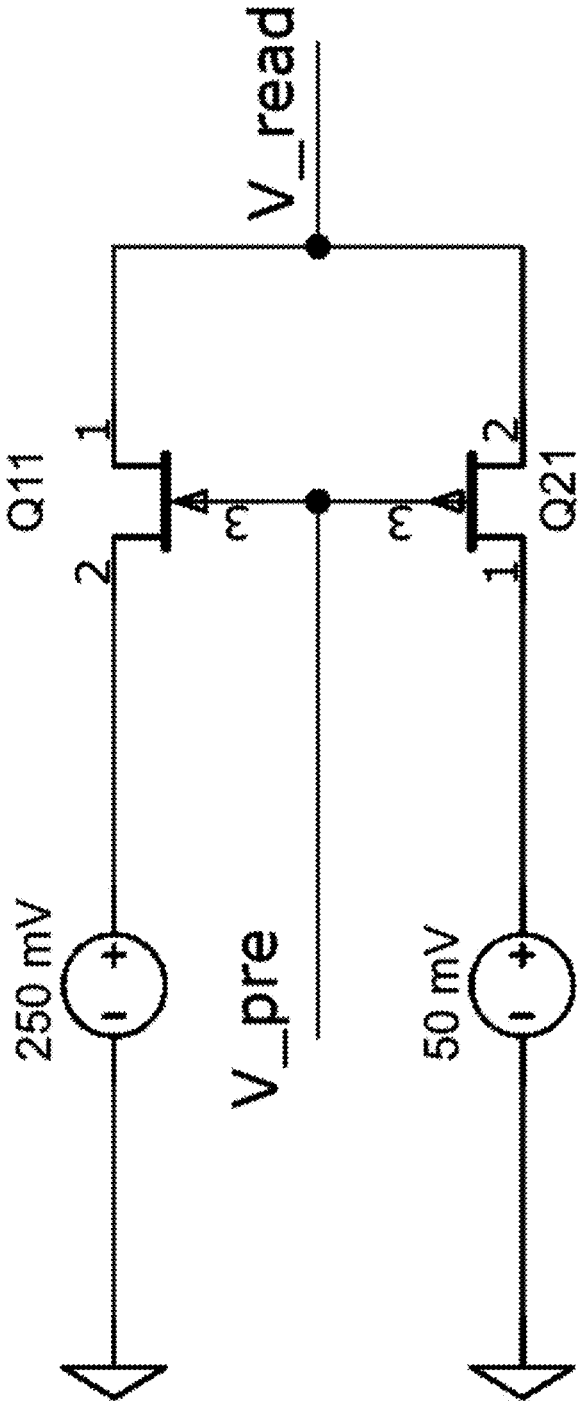
FIGS. 5B-5C show exemplary STDP circuit designs, according to an embodiment.

In some embodiments, the circuit shown in FIG. 5B may be used to multiplex between the 'read' and 'strong read' voltages of 50 mV and 250 mV. When V_pre is high, the NMOS Q11 turns on and passes 250 mV. When V_pre is low, the PMOS Q21 turns on and passes the 50 mV. This circuit is local to a neuron and not to a synapse.

Figure 5C:
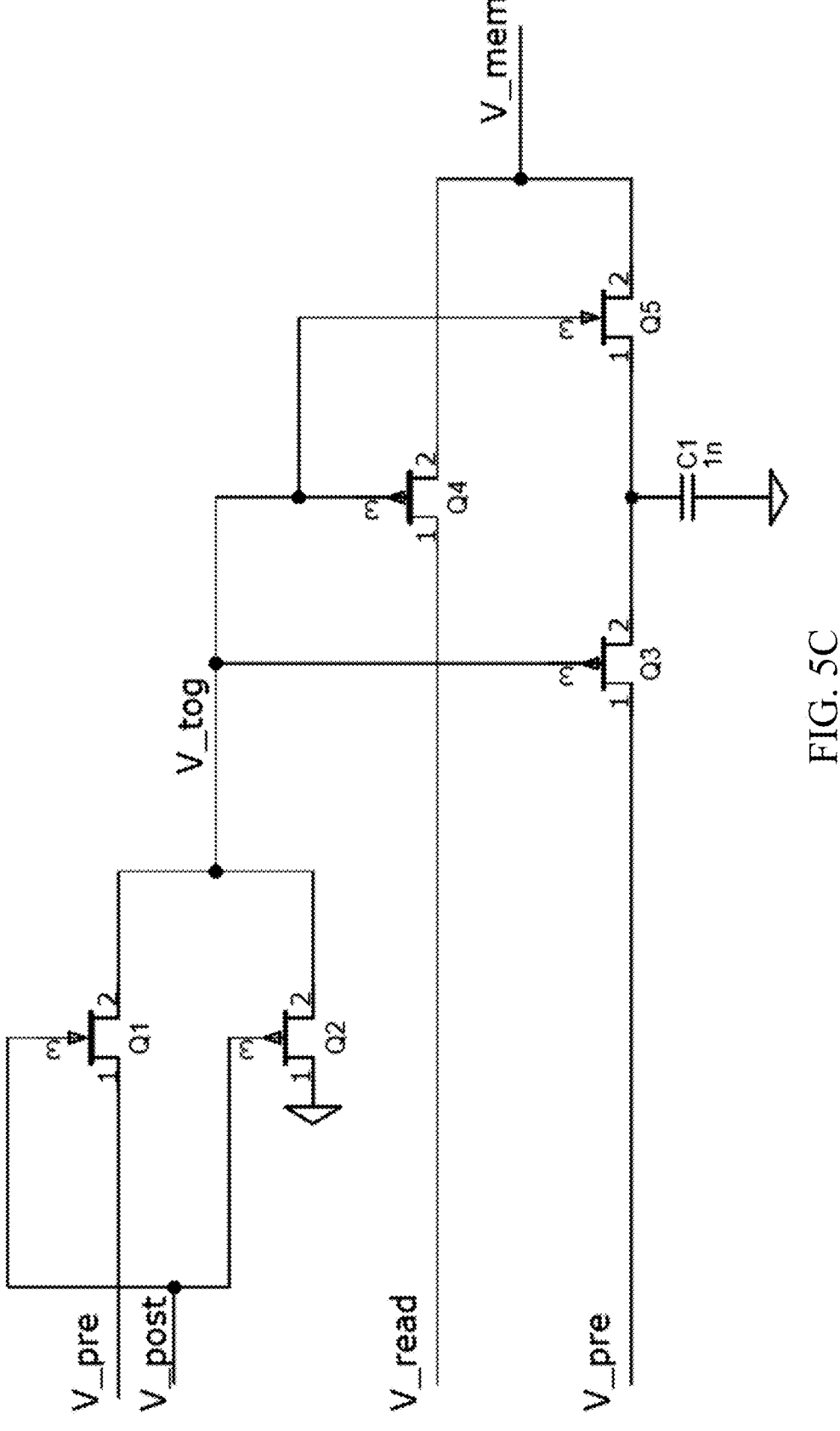

FIG. 5C shows an exemplary synapse circuitry, wherein Q1 and Q2 together make up a pass transistor logic AND gate, and V_tog is the AND of V_pre and V_post. When V_tog is low, Q4 and Q3 are on and Q5 is off. Hence the read voltage passes to V_mem, which is directly connected to the memristor. Because Q3 is on, the charge stored in the capacitor would be proportional to V_pre. If V_pre was high, then C1 would store a positive charge. If V_pre was low, then C1 would store a negative charge. C1 should be small enough so that it reacts almost instantly to V_pre. Conversely, when V_tog becomes high, Q3 and Q4 turn off, and Q5 turns on. The charge stored in the capacitor is used to update the synapse. The synapse gets updated when both the neurons fire together. If both the neurons fire almost simultaneously, then the duration for which they fire together will be more. Thus, they will be updated to a larger extent.

Figure 5D:
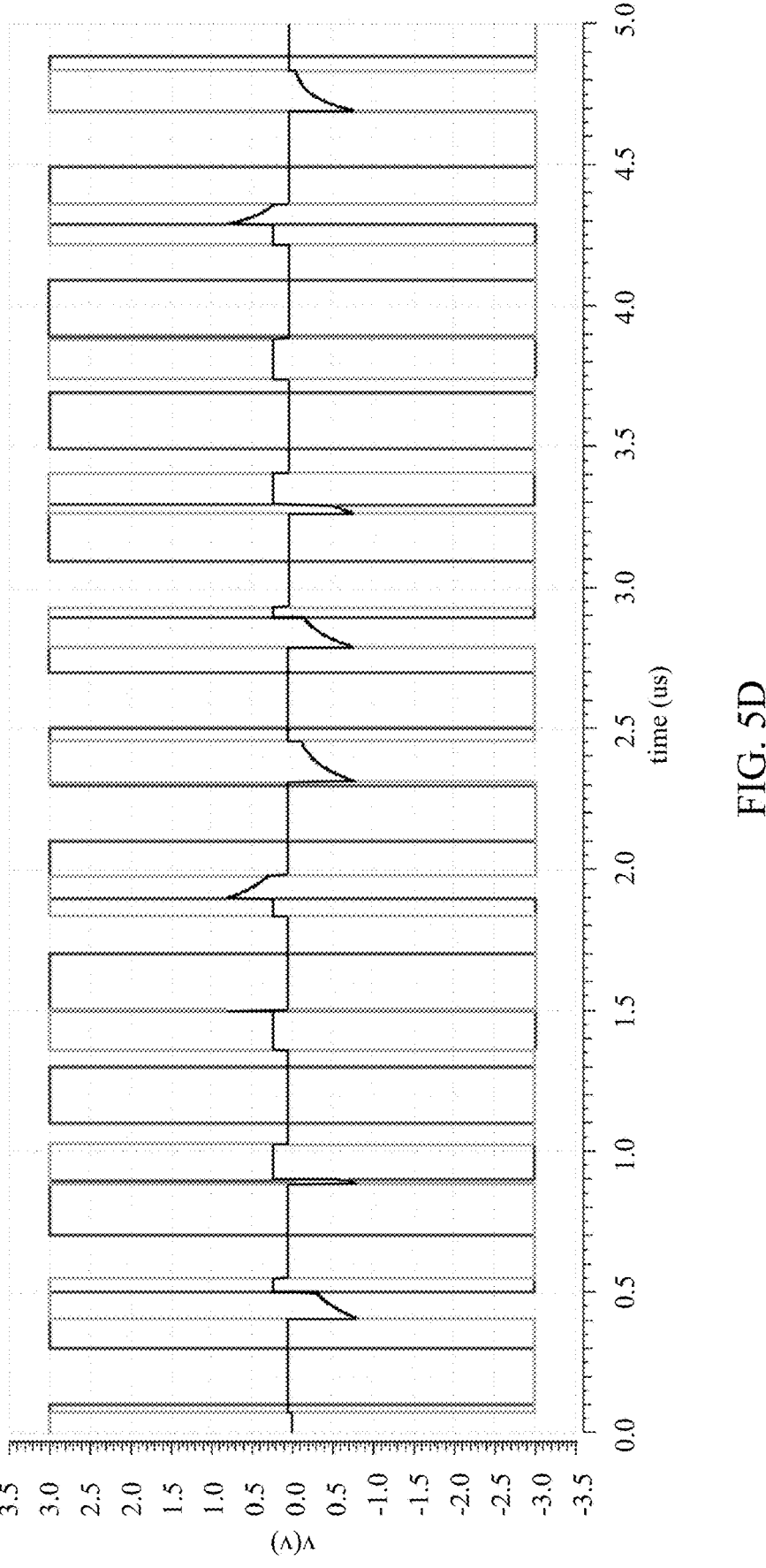
FIG. 5D shows waveforms associated with STDP, according to an embodiment.

FIG. 5D shows waveforms associated with the obtained STDP. This confirms the expected output because the Δt value is smaller at 0.4 μs. A similar observation can be made at 1.5 μs and 1.9 μs. Thus, this circuit follows STDP to a closer extent, however, it requires a higher die area, because a synapse consists of 5 transistors.

In a gradient descent example, the number of input neurons is m and the number of output neurons is 1. Vi is used to denote each of the analog inputs. The weights are represented using Wi. The analog value of the output, A, is computed by the dot product of the weights and the input:

$$A = \sum_{i=0}^{N-1} Wi \cdot Vi$$

A teaching label ti is used to find the error of the prediction. The mean square error for the batch is computed and the weights are trained so that the MSE decreases over time:

$$E = \frac{1}{2} \sum_{k=1}^{k} \left(A^{(k)} - t^{(k)}\right)^2$$

$$\Delta W_i^{(k)} = -\eta \frac{\partial E}{\partial W_i^{(k)}} \Rightarrow \Delta W_i^{(k)} = -\eta \frac{\partial E}{\partial A^{(k)}} \cdot \frac{\partial A^{(k)}}{\partial W_i}$$

$$\Rightarrow \Delta W_i^{(k)} = -\eta (A^{(k)} - t^{(k)}) V_i^{(k)}$$

Figure 6A:
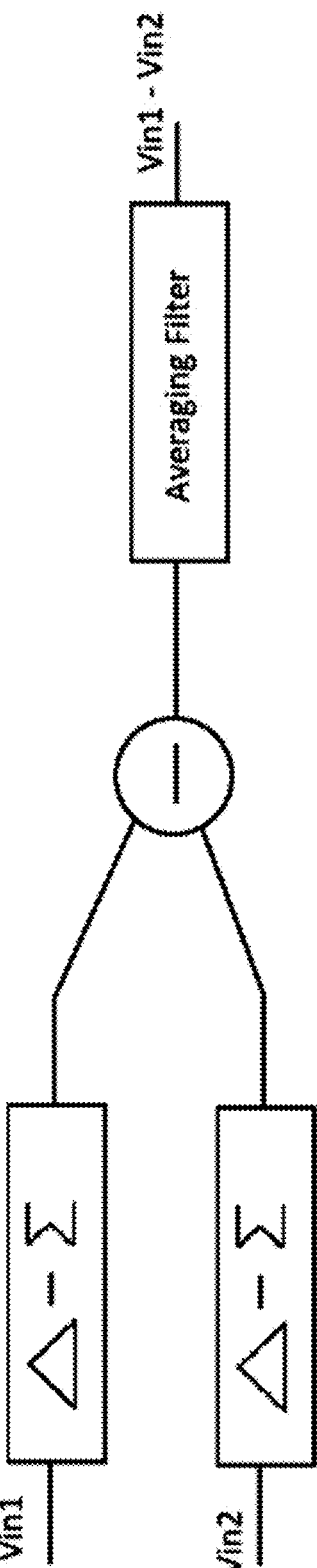
FIGS. 6A-6C shows exemplary gradient descent circuit designs, according to an embodiment.

FIG. 6A shows an exemplary circuit design. The weight update rule ΔW requires two mathematical operations, subtraction and multiplication. If 2 signals are subtracted after being ΔΣ modulated, then after passing them through an averaging filter, the value obtained is equal to the numerical difference between the 2 signals, plus some added quantization noise.

Figure 6B:
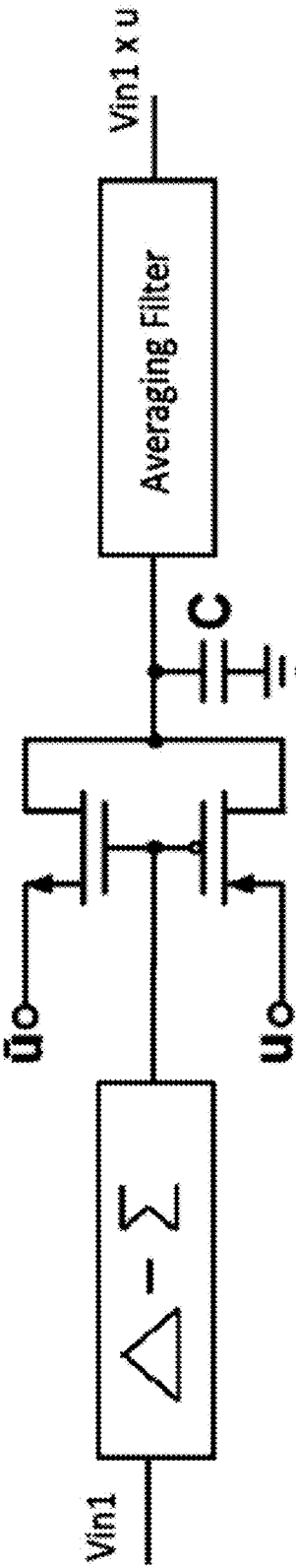

Carrying out multiplication is a more challenging task. As can be seen in FIG. 6B, if the gates of 1 PMOS and 1 NMOS are connected (with sources connected to u and −u), and the ΔΣ modulated pulse is applied at the input, then the output obtained after passing through an averaging filter is numerically equal to their product. This is similar to the 2T–1R synapse structure.

These circuits provide all the computational elements needed for carrying out the weight update.

The gradient descent algorithm uses 2 clock cycles. First, during the read cycle, the inputs are passed through the synapses to generate the output. In the write cycle, the errors generated are used to write/update the weights. A global clock may be used to achieve this.

In addition, a memory component is required to store the analog output obtained after the read cycle. An integrator coupled with a hold can act as an averaging filter and a memory element, which may be reset after every write cycle.

Figure 6C:
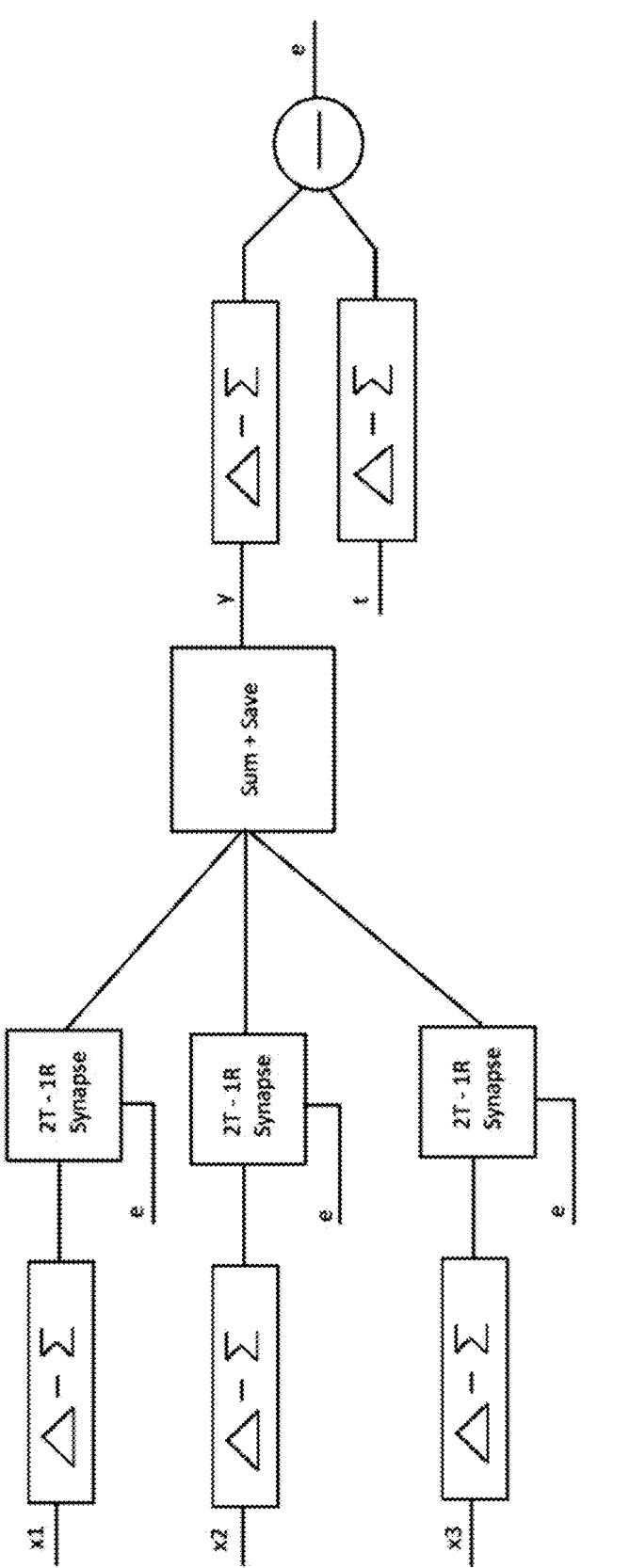

FIG. 6C shows a schematic exemplary circuit. The 2T-1R synapse has 3 inputs: u, u' and e. If e is high, then u is selected, otherwise u' is selected. During the read cycle, the output of ΔΣ is shorted to u' and e is shorted to low. Hence the output of the modulator passes through the memristor, gets summed up and then gets averaged and stored in the integrator.

During the write/update cycle, the difference of the ΔΣ modulated output and teaching signal is shorted to the e input of the 2T-1R synapse. The u and u' inputs are shorted to high and low. Hence the value of e is used to update the memristor.

The write/update stage is followed by a reset cycle to reset the integrators.

In experimental results, a small neural network with 1 neuron in the input layer and the output layer was trained. The global clock is initially in reset for 0.1 μs, followed by read for 4 μs and write for 3.9 μs. During the read phase, the inputs are integrated and a prediction is obtained. During the update stage, the inputs remain constant, but the weights get updated. It is observed that, over time, the error reduces and the weights converge to a value of 0.5 as was the target.

Training by Gradient Descent

A ΔΣ based neuron structure has been proposed for achieving gradient descent. The inherent dithering feature of ΔΣ can prevent the weights from being stuck at a local minima. In addition, the non-linear ΔΣ activation function can be useful in a multi-layer design. The neurons are built using ΔΣ modulators, while the synapses use a 2T-1R structure.

A single layer NN has been built as a proof of concept.

Training Evaluation

Supervised Learning Using SGD

The circuit disclosed herein was designed in Cadence Virtuoso using 180 nm CMOS technology and the VTEAM model (Kvatinsky [2015]). The design parameters are provided in Table 1.

TABLE 1

| Circuit Parameters | | | |
|---|---|---|---|
| PARAMETER | VALUE | PARAMETER | VALUE |
| Power Supply | | | |
| $V_{DD}$ | +1.8 V | $V_{EE}$ | −1.8 V |
| NMOS | | PMOS | |
| W/L | 10 | W/L | 20 |
| $V_{TN}$ | 0.56 V | $V_{TP}$ | −0.57 V |

TABLE 1-continued

| Circuit Parameters | | | |
|---|---|---|---|
| PARAMETER | VALUE | PARAMETER | VALUE |
| Memristor | | | |
| $V_{on/off}$ | −0.3 V, 0.4 V | $R_{on/off}$ | 2 kΩ, 100 kΩ |
| $K_{on/off}$ | −4.8 mm/s, 2.8 mm/s | $\alpha_{on/off}$ | 1, 1 |
| Operating Point | | Delta—Sigma Modulator | |
| $R_{out}$ | 104 kΩ | $t_{pulse}$ | 100 ns |
| $R_{ref}$ | 51 kΩ | # pulses | 32 |

This circuit model was tested for different scaled fully-connected networks by computer simulations (MATLAB) using the four datasets specified in Table 2 below. The weights are calculated around an operating point, as specified in, e.g., E. Rosenthal, S. Greshnikov, D. Soudry, and S. Kvatinsky, "A Fully Analog Memristor-based Neural Network with Online Gradient Training," Proceedings of the IEEE International Symposiun on Circuits and Systems (ISCAS), pp. 1394-1397 May 2016. Simulations were also performed considering noise and process variations, using parameters and evaluation methodology similar to L. Danial, N. Wainstein, S. Kraus, and S. Kvatinsky, "DIDACTIC: A Data-Intelligent Digital-to-Analog Converter with a Trainable Integrated Circuit Using Memristors," IEEE Journal on Emerging and Selected Topics in Circuits and Systems, Vol. 8, No. 1, pp. 146-158, March 2018.

TABLE 2

| Datasets Used for Training and Testing | | | | |
|---|---|---|---|---|
| Dataset | Training Samples | Test Samples | Size of network | # Epochs |
| W. D. Breast Cancer | 399 | 170 | 30 × 2 | 10 |
| Wine | 130 | 48 | 13 × 3 | 10 |
| Iris | 120 | 30 | 4 × 4 × 3 | 10 |
| MNIST | 60,000 | 10,000 | 784 × 100 × 100 × 10 | 10 |

Figure 7A:
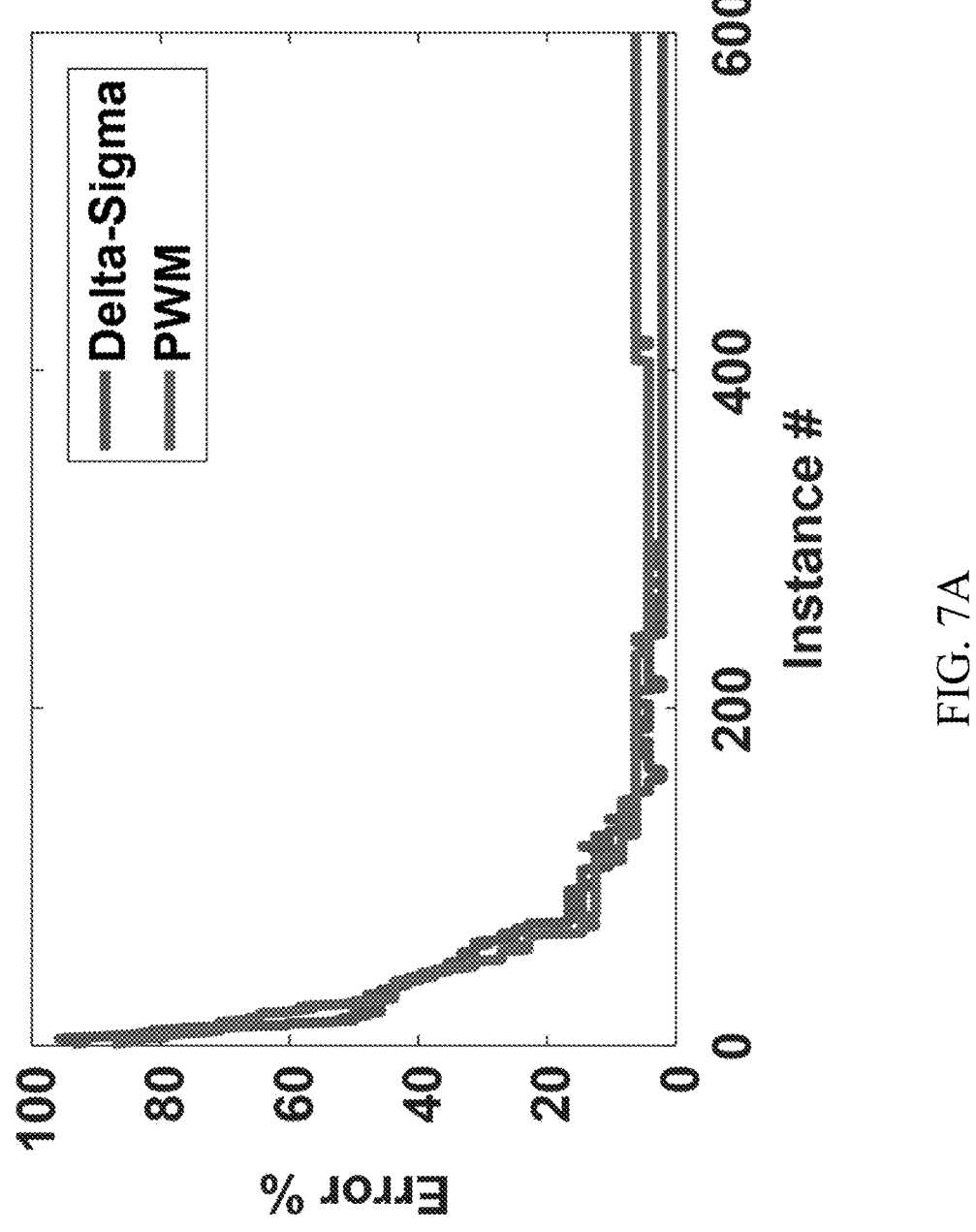
FIGS. 7A-7G illustrate experimental results.
Figures 7B, 7C, 7D, 7E, 7F, 7G:
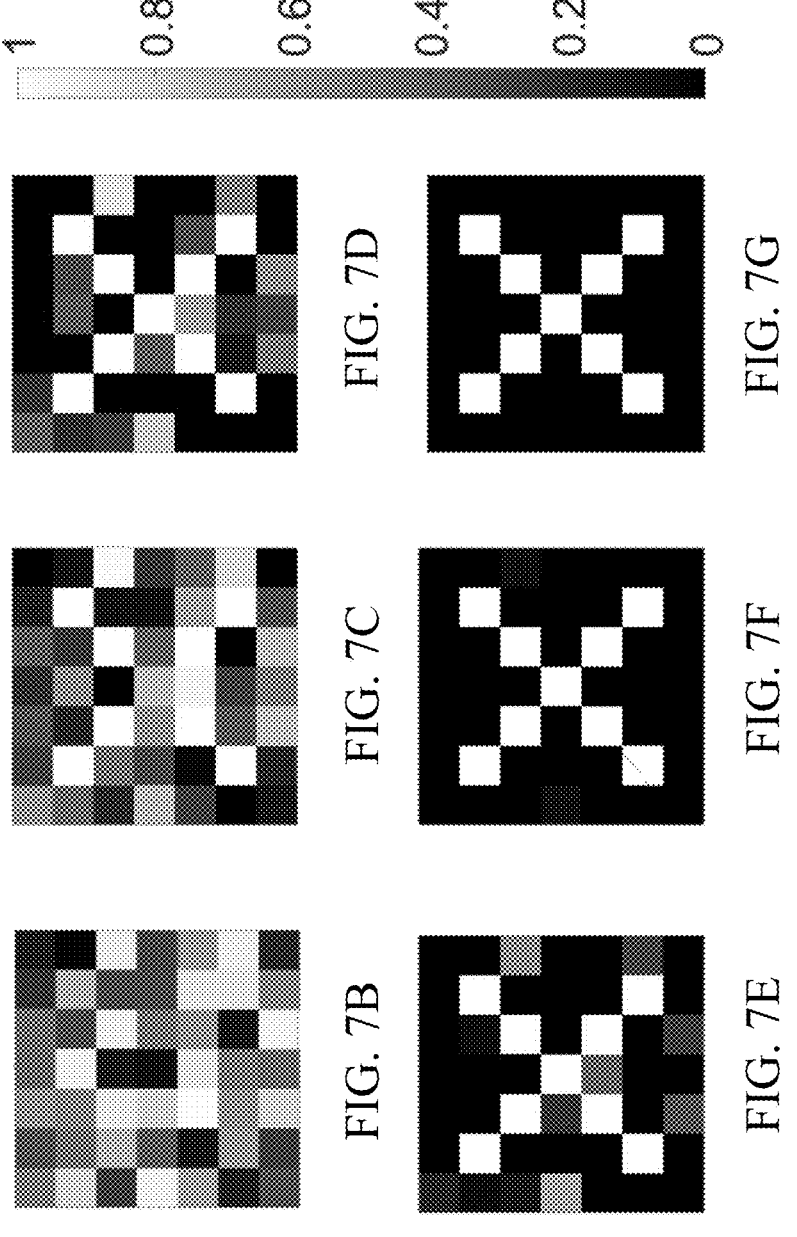

The results suggest that ΔΣ is a better contender than PWM, as can be seen from Table 3 and FIG. 7A.

TABLE III

| Testing Accuracy (Error %) | | | | | |
|---|---|---|---|---|---|
| | MATLAB | Delta-Sigma Activation | | PWM Activation | |
| Dataset | Model | Ideal | Noisy | Ideal | Noisy |
| W. D. Breast Cancer | 2.604% | 2.447% | 4.235% | 2.647% | 4.27% |
| Wine | 1.115% | 1.125% | 2.083% | 1.791% | 2.166% |
| Iris | 2.432% | 2.666% | 3.333% | 2.76% | 3.413% |
| MNIST | 2.54% | 2.63% | 3.851% | 2.65% | 4.012% |

ΔΣ neural networks offer a significant advantage over PWM in terms of speed. While the convergence during training takes a similar number of steps, each step is shorter for the ΔΣ; the PWM pulses had 10 μs duration, while the ΔΣ output had multiple pulses with a maximum total duration of 3.2 μs, providing, at least, a speedup of 3.125×, thanks to the noise shaping property, which enables ΔΣ to achieve higher accuracy in shorter time. Furthermore, the transfer function of the PWM is linear, as can be seen from FIG. 1B, in contrast to the ΔΣ, which significantly benefits from additional non-linearity due to the quantization error. For deeper ANNs, we believe that the linearity of PWM could drastically hamper the training performance. PWM also consumes more power than ΔΣ due to the ramp function needed to generate the PWM signal. Finally, ΔΣ more closely emulates the natural spiking that occurs in the brain. Accordingly, such improvements may increase with the scale and depth of ANNs.

Unsupervised Learning Using STDP

To demonstrate STDP using ΔΣ, a two-layer neural network with 49 neurons in the first layer and one output neuron in the second layer was modeled, similar to S. Ambrogio et al., "Neuromorphic Learning and Recognition With One-Transistor-One-Resistor Synapses and Bistable Metal Oxide RRAM," IEEE Transactions on Electron Devices, Vol. 63, No. 4, pp. 1508-1515 April 2016. The first layer, which acts as a retina, is fed a pattern resembling the one in FIG. 3G. Each instance of the pattern is composed of 1s and 0s, and the overall pattern resembles an 'X' when displayed as a 7×7 matrix. The input is alternated between the pattern and random noise, with each having respectively 60% and 40% probability of occurrence in an instance. Additionally, each of the individual noise sources in the 7×7 matrix have 50% chance of being '1' and 50% of being '0'.

FIGS. 7B-7G depict the evolution of weights over time, demonstrating the training. After 50 trials, the weight matrix retrieves the input, and the network is trained successfully.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An artificial neural network (NN) circuit comprising:
a plurality of interconnected neural network elements, each neural network element comprising:
a neuron circuit comprising:
a first delta-sigma modulator configured to receive input voltage signal and generate a modulated representation of the input voltage signal; and an averaging filter, wherein a transfer function of the neuron circuit serves as an activation function; and at least one synapse device comprising a memristor connected to an output of said neuron circuit, wherein a conductance of the memristor represents an adjustable synaptic weight of said at least one synapse device; and a memristor driver circuit comprising:

at least one second delta-sigma modulator configured to receive at least one stored weighted sum and at least one desired value form a training dataset;

at least one integrator module adapted to implement an averaging filter on output of said second delta-sigma modulator;

at least one subtractor configured to compute error signal; and wherein said neural network (NN) is trained by an iterative process comprising:

a read phase comprising:

(i) inputting the at least input voltage signal into said neuron circuits; and (ii) calculating and storing a respective weighted sum of outputs of said neuron circuits, based on said synaptic weights; and an update phase comprising:

(i) feeding the at least one stored weighted sum and the at least one desired value from the training dataset to the second delta-sigma modulator to generate two modulated outputs;

(ii) calculating a cost function by subtracting the two modulated outputs using said subtractor; and (iii) adjusting said synaptic weights to minimize the cost function based on a gradient descent algorithm.

2. The artificial neural network (NN) circuit of claim 1, wherein said plurality of interconnected neural elements form at least one trainable single-layer neural network, arranged as a memristive crossbar array comprising a synaptic weightings matrix.

3. The artificial neural network (NN) circuit of claim 2, wherein an output vector of said single-layer neural network comprises a plurality of weighted sum of said outputs of said neuron circuits multiplied by said synaptic weightings matrix.

4. The artificial neural network (NN) circuit of claim 3, further comprising an output circuit comprising at least one delta-sigma modulator, wherein said output circuit encodes said output vector.

5. The artificial neural network (NN) circuit of claim 2, wherein said neural network comprises two or more of said single-layer neural networks (NNs) to form a deep neural network (DNN).

6. The artificial neural network (NN) circuit of claim 1, wherein said iterative process continues until the at least one stored weighted sum of outputs corresponds to the desired value from the training dataset.

7. The artificial neural network (NN) circuit of claim 1, further comprising a plurality of input neuron circuits, a plurality of synapse devices, and at least one output neuron circuit, wherein, at the training stage, said neural network (NN) is trained by an unsupervised spike time-dependent plasticity (STDP) process, wherein outputs of said neuron circuits reflect spikes encoded in time.

8. The artificial neural network (NN) circuit of claim 7, wherein said STDP process comprises comparing pre-synaptic and post-synaptic outputs of said neuron circuits, wherein a difference detected in said comparison leads to long-term potentiation or long-term depression.

9. The artificial neural network (NN) circuit of claim 1, wherein the gradient descent algorithm is a synchronous algorithm, comprising:

a read clock cycle, during which the at least input voltage signal is passed through the synapse devices of the interconnected neural network elements to generate an output vector; and a write clock cycle, during which a mean-square error cost function is calculated to update the synaptic weights.

10. The artificial neural network (NN) circuit of claim 9, wherein said delta-sigma modulators are configured to oversample input voltage signals, and wherein said neuron circuits further comprise:

a memory component, adapted to store the output vector obtained after the read cycle; and an integrator module, coupled with said memory element, and adapted to: (i) implement the averaging filter on said output vector and (ii) be reset after every write cycle.

11. The artificial neural network (NN) circuit of claim 1, wherein said read phase reflects a feedforward operation of said neural network (NN), and said update phase reflects an error backpropagation operation of said neural network (NN).

12. The artificial neural network (NN) circuit of claim 1, wherein said memristor driver circuit further comprises at least one operational amplifier configured to amplify output signals from said memristors.

* * * * *